US009754486B2

(12) United States Patent
Altintas et al.

(10) Patent No.: US 9,754,486 B2
(45) Date of Patent: Sep. 5, 2017

(54) SAFETY INFORMATION TRANSMISSION METHOD AND SAFETY INFORMATION TRANSMISSION SYSTEM

(71) Applicant: TOYOTA INFOTECHNOLOGY CENTER CO., LTD., Tokyo (JP)

(72) Inventors: Onur Altintas, Kawasaki (JP); Haris Kremo, Tokyo (JP); Hideaki Tanaka, Shiki (JP)

(73) Assignee: TOYOTA INFOTECHNOLOGY CENTER CO., LTD., Tokyo (JP)

( * ) Notice: Subject to any disclaimer, the term of this patent is extended or adjusted under 35 U.S.C. 154(b) by 0 days.

(21) Appl. No.: 14/911,185

(22) PCT Filed: Sep. 9, 2014

(86) PCT No.: PCT/JP2014/073820
§ 371 (c)(1),
(2) Date: Feb. 9, 2016

(87) PCT Pub. No.: WO2015/045853
PCT Pub. Date: Apr. 2, 2015

(65) Prior Publication Data
US 2016/0189543 A1 Jun. 30, 2016

(30) Foreign Application Priority Data

Sep. 30, 2013 (JP) .................................. 2013-204573

(51) Int. Cl.
*G08G 1/09* (2006.01)
*G08G 1/0967* (2006.01)
(Continued)

(52) U.S. Cl.
CPC ..... *G08G 1/096791* (2013.01); *G08B 25/009* (2013.01); *G08B 27/008* (2013.01);
(Continued)

(58) Field of Classification Search
CPC ...... B65D 2203/10; B65D 2519/00034; B65D 2519/00069; B65D 2519/00139;
(Continued)

(56) References Cited

U.S. PATENT DOCUMENTS 7,200,409 B1 * 4/2007 Ichikawa ............. G08B 25/016
455/426.1
8,514,825 B1 8/2013 Addepalli et al.
(Continued)

FOREIGN PATENT DOCUMENTS

JP 2009-124448 A 6/2009
JP 2009-259044 A 11/2009
JP 2012-164198 A 8/2012

OTHER PUBLICATIONS

Dec. 16, 2014 International Search Report issued in International Patent Application No. PCT/JP2014/073820.

*Primary Examiner* — Daniel Previl
(74) *Attorney, Agent, or Firm* — Oliff PLC

(57) ABSTRACT

A safety information transmission method includes a step wherein a first portable terminal transmits the safety information to the vehicle-mounted terminal, a step wherein the vehicle-mounted terminal stores the safety information received from the first portable terminal, a step wherein the vehicle-mounted terminal transmits the safety information to another vehicle-mounted terminal by a vehicle-to-vehicle communication, a step wherein the vehicle-mounted terminal stores the safety information received from the other vehicle-mounted terminal by the vehicle-to-vehicle communication, and a step wherein any of the vehicle-mounted terminals transmits the safety information stored in the vehicle-mounted terminal to an information server via an access point when the vehicle-mounted terminals has reached a communication possible area of the access point, or transmits the safety information stored in the vehicle- (Continued)

mounted terminal to a second portable terminal when the vehicle-mounted terminal has become capable of communicating with the second portable terminal.

11 Claims, 10 Drawing Sheets

(51) Int. Cl.
    *H04W 4/22*     (2009.01)
    *H04M 3/51*     (2006.01)
    *H04W 4/04*     (2009.01)
    *G08B 25/00*     (2006.01)
    *G08B 27/00*     (2006.01)
    *H04W 24/04*     (2009.01)
    *H04L 29/08*     (2006.01)

(52) U.S. Cl.
    CPC ........... *H04L 67/12* (2013.01); *H04M 3/5116* (2013.01); *H04W 4/046* (2013.01); *H04W 4/22* (2013.01); *H04W 24/04* (2013.01)

(58) Field of Classification Search
    CPC ........... B65D 2519/00273; B65D 2519/00437; B65D 2519/00442; B65D 2519/00562; B65D 19/0016; B65D 19/38; B65D 2519/00293; B65D 2519/003
    USPC ....... 340/905, 902, 903, 935, 936, 989, 991, 340/425.5, 426.1, 429, 426.11, 426.15
    See application file for complete search history.

(56) References Cited

U.S. PATENT DOCUMENTS

| | | | | |
|---|---|---|---|---|
| 2002/0197955 | A1* | 12/2002 | Witkowski | G07C 5/008 455/41.1 |
| 2010/0299001 | A1* | 11/2010 | Suzuki | H04W 88/02 701/2 |
| 2013/0078964 | A1* | 3/2013 | Jin | H04W 4/16 455/414.1 |
| 2013/0099941 | A1 | 4/2013 | Jana et al. | |
| 2013/0293394 | A1* | 11/2013 | Rubin | G08G 9/02 340/902 |
| 2014/0051346 | A1* | 2/2014 | Li | H04H 20/59 455/3.01 |

\* cited by examiner

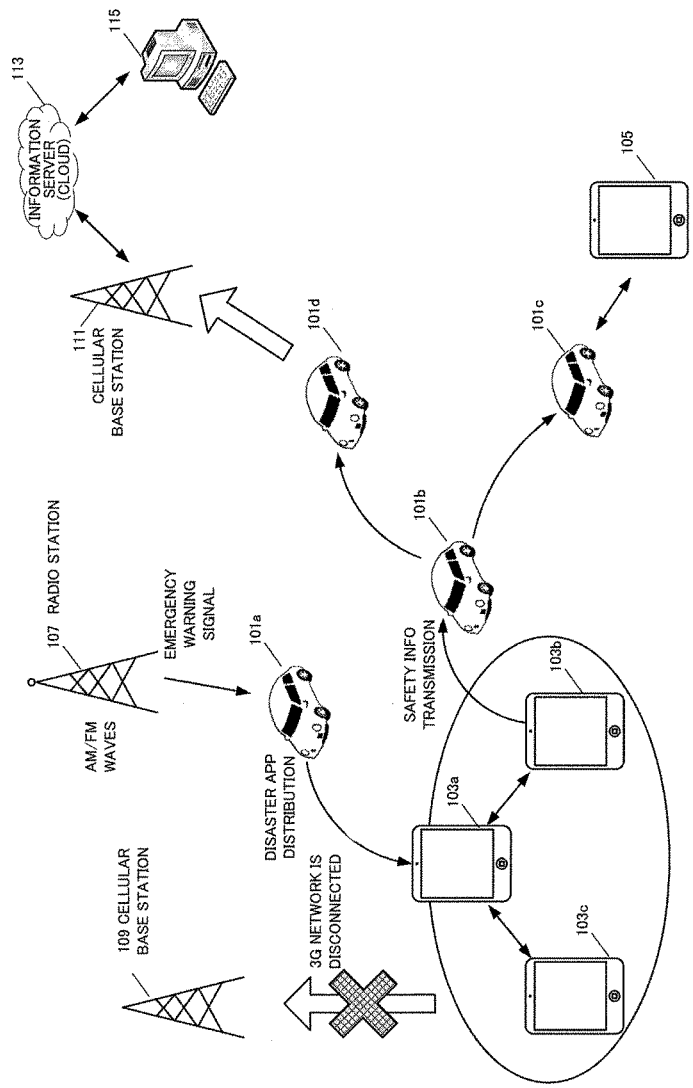

[Fig. 2]
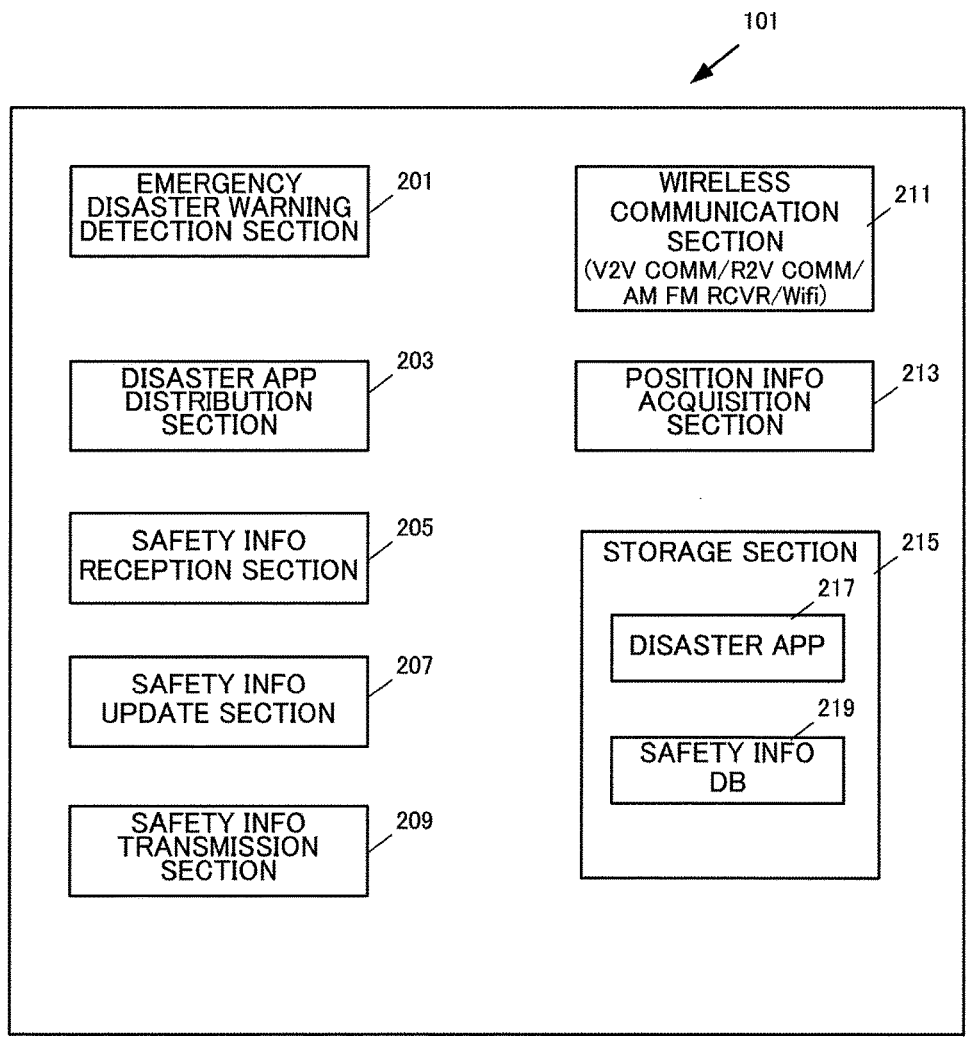

[Fig. 3]
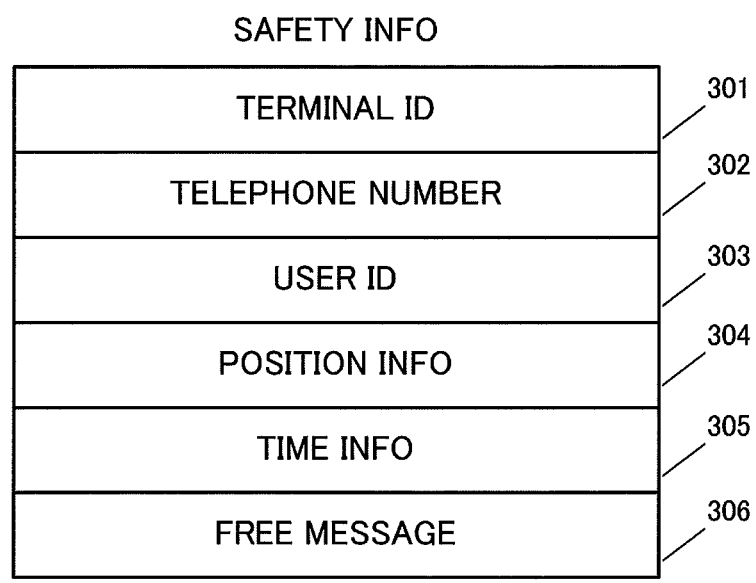

[Fig. 4]
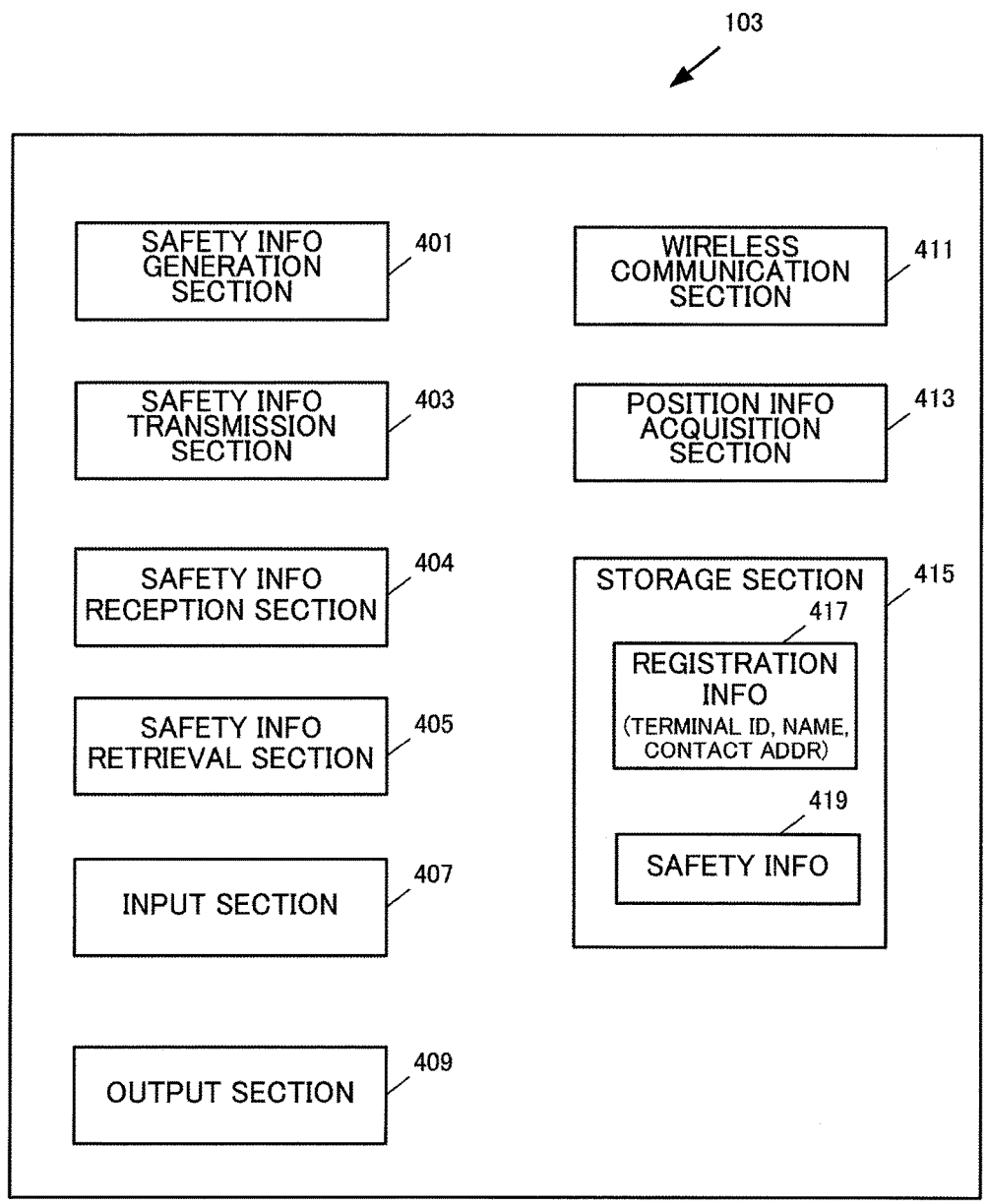

[Fig. 5]
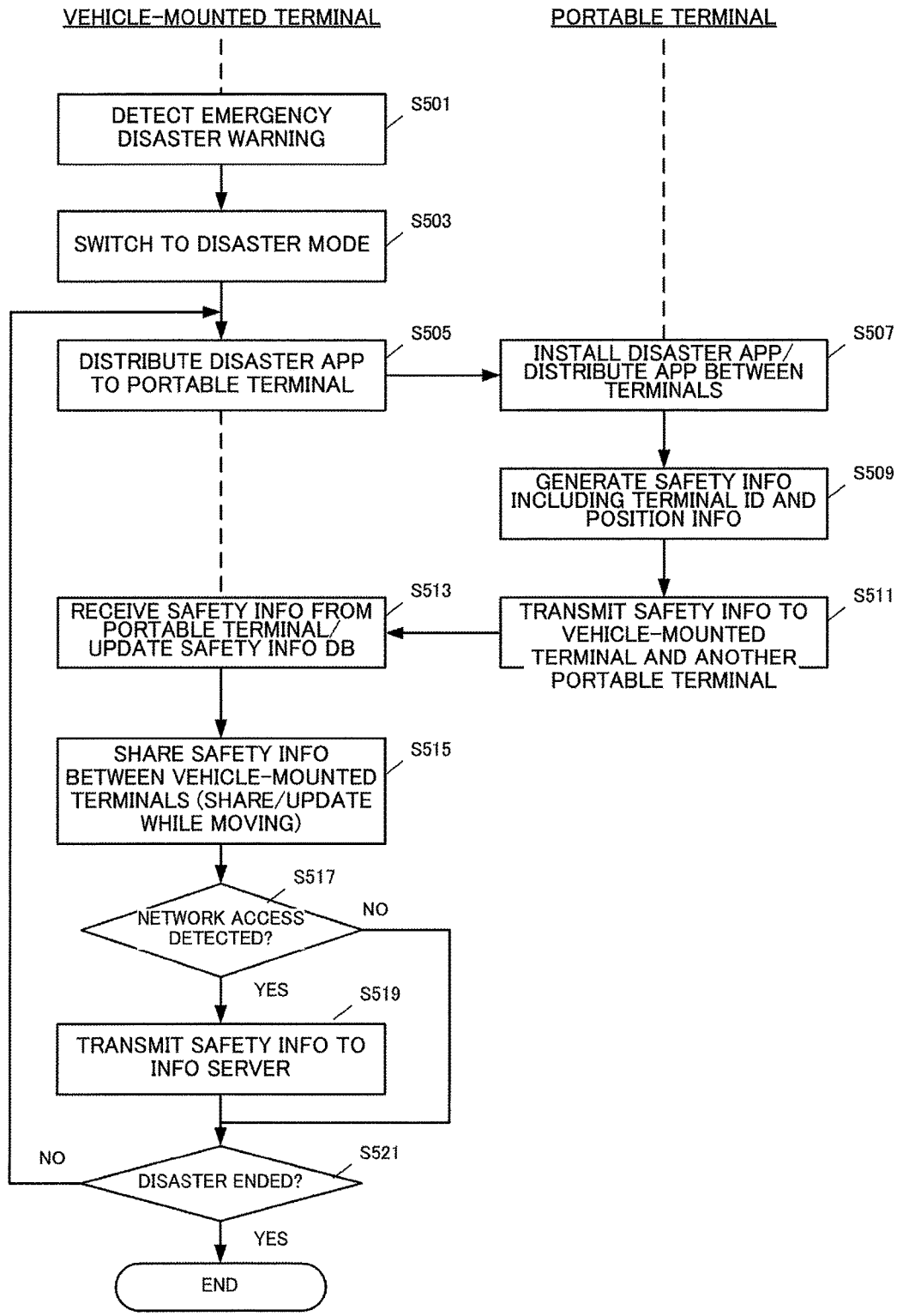

[Fig. 6]
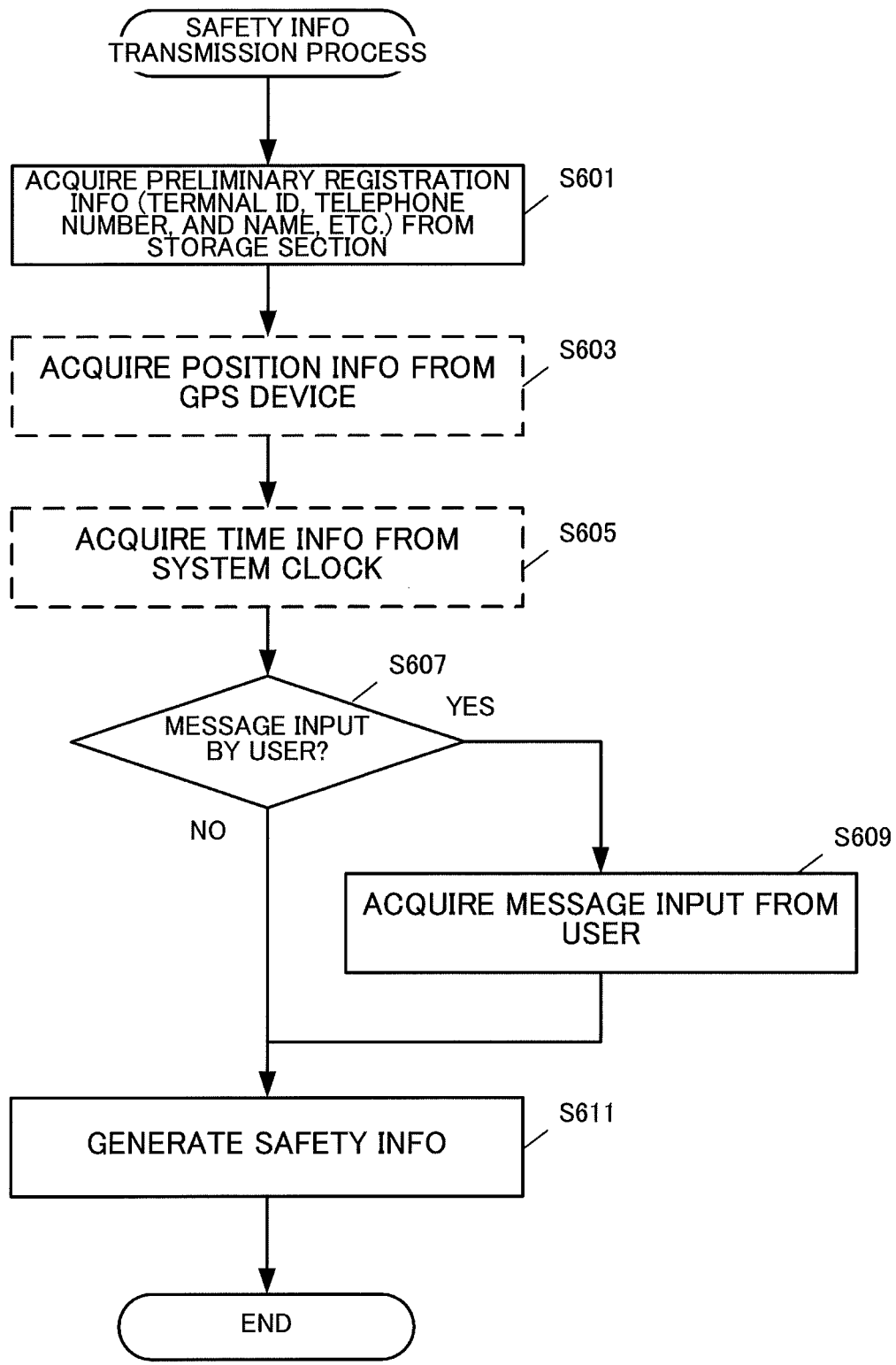

[Fig. 7]
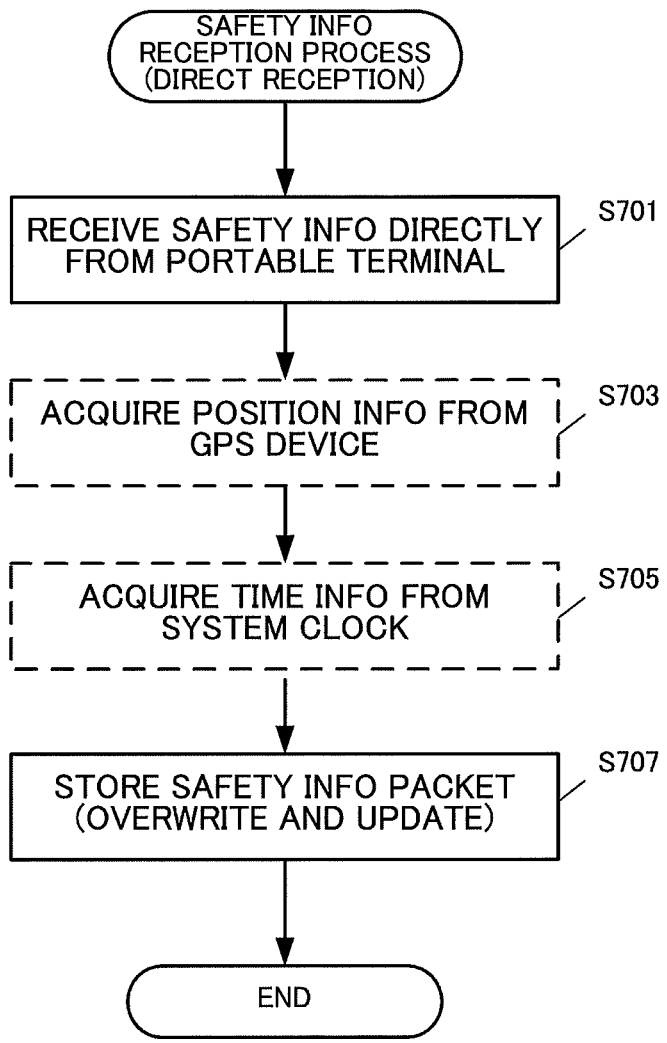

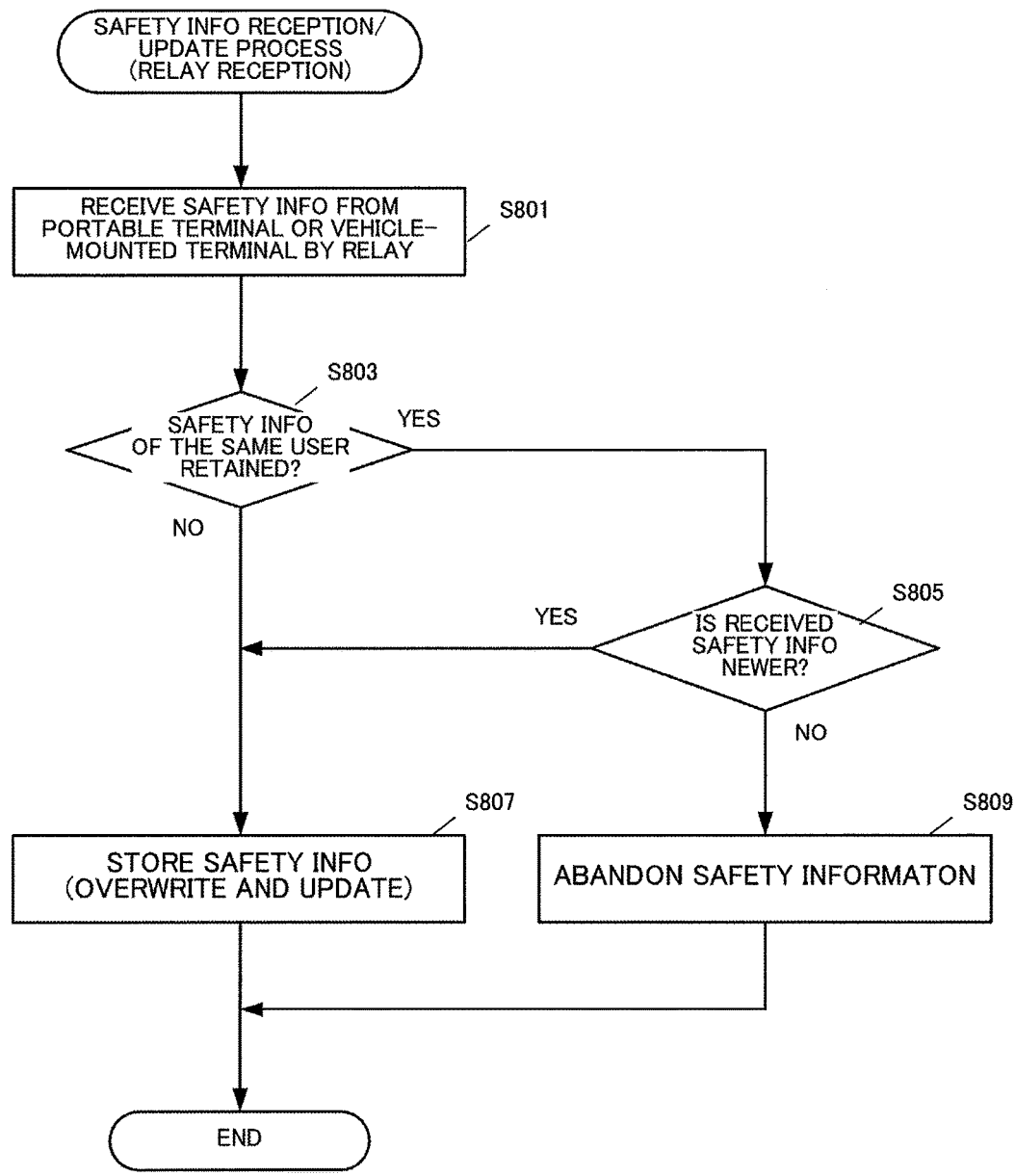

[Fig. 9]
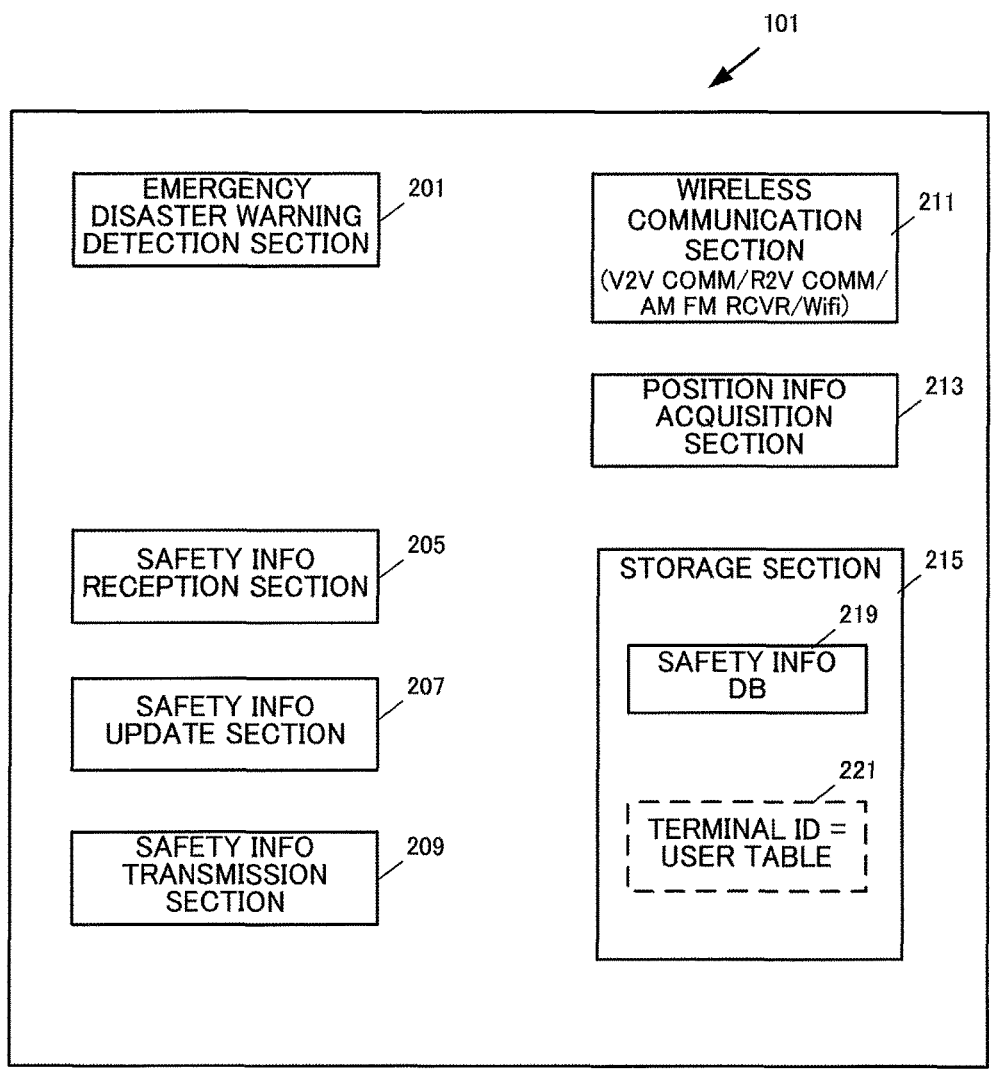

[Fig. 10]
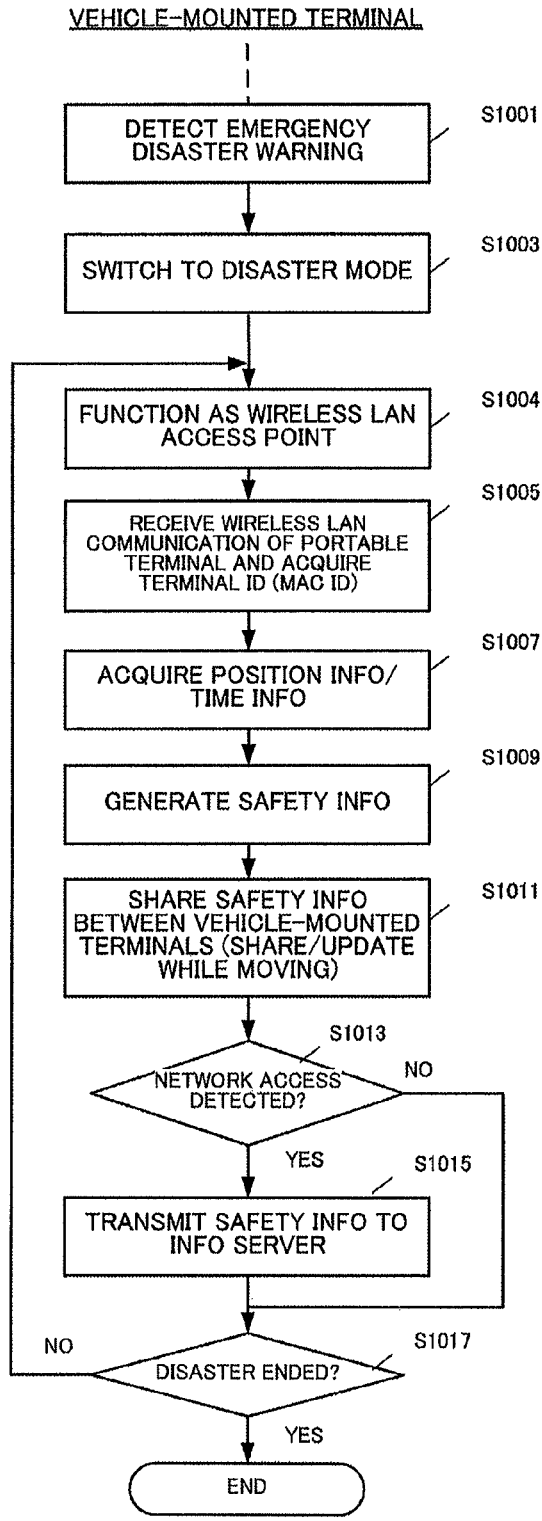

SAFETY INFORMATION TRANSMISSION METHOD AND SAFETY INFORMATION TRANSMISSION SYSTEM

TECHNICAL FIELD

The present invention relates to a technique for transmitting safety information in the case where the operation of a wide area network is halted during disaster or the like.

BACKGROUND ART

In the case where a disaster such as a large earthquake occurs, there may occur a situation in which an infrastructure of a wide area communication such as a cellular network or an Internet access network breaks down or congestion of the communication occurs so that the communication cannot be performed. When such a situation occurs, it becomes impossible to contact a sufferer so that the safety of the sufferer cannot be ascertained. In order to cope with this situation, a system for transmitting safety information at the time of disaster is studied and developed.

PTL 1 discloses a system in which safety information is exchanged between information communication terminals such as cellular phones and notebook computers, and the safety information is thereby propagated to a surrounding area. However, the propagation of the information via direct communication between the information communication terminals results in slow spreading speed of the information and narrow spread area. This is particularly due to the fact that the communication range of the direct communication by the information communication terminal is narrow and the fact that the sufferer cannot move a long distance.

PTL 2 discloses a system that allows acquisition of information even in an environment in which a communication infrastructure is not provided, though it does not take account of disaster occurrence. In PTL 2, the current position and destination of a vehicle are managed and, in the case where a first vehicle travels to the destination where the communication infrastructure is not provided, selected is a second vehicle which becomes capable of communicating with the first vehicle by a vehicle-to-vehicle communication before the first vehicle reaches the destination, and information related to the destination of the first vehicle is transmitted to the second vehicle. With this, the first vehicle can acquire the information related to the destination via the second vehicle. However, it is difficult to implement a process of grasping the current positions and the destinations of all vehicles at the time of disaster, and the system cannot be used without alteration as a safety information transmission method at the time of disaster.

CITATION LIST

Patent Literature

[PTL 1] Japanese Patent Application Laid-open No. 2009-259044
[PTL 2] Japanese Patent Application Laid-open No. 2012-164198

SUMMARY OF INVENTION

Technical Problem

The present invention has been made in consideration of the above problem, and an object thereof is to provide a technique capable of sharing safety information widely and speedily even in the case where the operation of the wide area network is halted during disaster or the like.

Solution to Problem

A safety information transmission method according to a first aspect of the present invention is a safety information transmission method in a safety information transmission system constituted by a portable terminal and a plurality of vehicle-mounted terminals, and includes a step in which a first portable terminal transmits safety information to the vehicle-mounted terminal, a step in which the vehicle-mounted terminal stores the safety information received from the first portable terminal, a step in which the vehicle-mounted terminal transmits the safety information to another vehicle-mounted terminal by a vehicle-to-vehicle communication, a step in which the vehicle-mounted terminal stores the safety information received from the other vehicle-mounted terminal by the vehicle-to-vehicle communication, and a step in which, in a case where any of the plurality of the vehicle-mounted terminals has reached a communication possible area of an access point, the vehicle-mounted terminal transmits the safety information stored in the vehicle-mounted terminal to an information server via the access point or transmits, in a case where the vehicle-mounted terminal has become capable of communicating with a second portable terminal, the safety information stored in the vehicle-mounted terminal to the second portable terminal.

By adopting the configuration described above, the safety information transmitted from the portable terminal is accumulated in the vehicle-mounted terminal, and the safety information is geographically spread by exchanging the safety information between the vehicle-mounted terminals by the vehicle-to-vehicle communication and the movement of the vehicle-mounted terminal itself. In the case where the vehicle-mounted terminal has reached the communication possible area of the access point of a wide area communication (the Internet or the like), by transmitting the accumulated safety information to the information server, a user having access to the wide area network (e.g., a user outside a disaster area) can check the safety information on a sufferer. Alternatively, in the case where the vehicle-mounted terminal has become capable of communicating with another portable terminal, by transmitting the accumulated safety information, it becomes possible to perform transmission of the safety information between areas where a communication infrastructure is halted.

The portable terminal is a portable computer device such as a cellular phone, a smartphone, a notebook computer, or a tablet computer, and has a wireless communication function. The vehicle-mounted terminal is a computer device that moves together with a vehicle, and has the wireless communication function. The vehicle-mounted terminal may be a device that is mounted fixedly to the vehicle, or may also be a device that is carried into the vehicle temporarily.

The safety information is information that is effective in grasping the safety of a sufferer or other users, and the safety information preferably includes an identifier that identifies at least the user or the portable terminal of the user. For example, the safety information preferably includes information that identifies an individual such as a user ID or a name, or information that identifies the terminal such as a telephone number, a MAC ID, or a production number (serial number). Besides the identifier described above, the safety information preferably includes other information items such as position information indicative of the position of the user or the portable terminal, time information indicative of a time at which the safety information is transmitted, and a message from the user.

The first aspect of the present invention preferably further includes a step in which the vehicle-mounted terminal receives a disaster occurrence notification, a step in which the vehicle-mounted terminal distributes a disaster application program to the first portable terminal in response to the reception of the disaster occurrence notification, and a step in which the first portable terminal installs the disaster application program distributed from the vehicle-mounted terminal, and the transmission of the safety information from the first portable terminal to the vehicle-mounted terminal is preferably performed via the disaster application program.

Further, the first aspect of the present invention preferably further includes a step in which the first portable terminal distributes the disaster application program distributed from the vehicle-mounted terminal to another portable terminal.

In order for the portable terminal to transmit the safety information at the time of disaster, it is preferable for the portable terminal to execute the application program. However, such an application program is not necessarily installed in the portable terminal. To cope with this, in the case where the vehicle-mounted terminal has received the disaster occurrence notification, the disaster application program is distributed from the vehicle-mounted terminal to the portable terminal, and the portable terminal installs the disaster application program, whereby it becomes possible to reliably perform processes such as the transmission of the safety information in each portable terminal in the event of a disaster. Further, by distributing the disaster application program not only from the vehicle-mounted terminal to the portable terminal but also from the portable terminal to the portable terminal, the program is installed in the portable terminals located in a wider area.

Alternatively, the first aspect of the present invention preferably further includes a step in which a disaster application program is pre-installed in the first portable terminal, and the transmission of the safety information from the first portable terminal to the vehicle-mounted terminal is preferably performed via the disaster application program.

By pre-installing the disaster application in the portable terminal, it is possible to omit a process of distributing or installing the program in the event of a disaster. The start of the disaster application may be automatically performed by using the reception of the disaster occurrence notification by the portable terminal or the reception of a notification from the vehicle-mounted terminal as a trigger, or the program may also be started manually by the user.

In the first aspect of the present invention, the safety information transmitted from the portable terminal may include a terminal ID, position information, and time information. In addition, the safety information transmitted from the portable terminal may include a terminal ID (does not include position information and time information), and the position information and the time information acquired on the side of the vehicle-mounted terminal having received the safety information may be stored such that the safety information includes the position information and the time information. If the position information and the time information are acquired in the portable terminal, an exact position is obtained, but it becomes necessary to equip and start a position information acquisition device (a GPS device or the like). If, for example, the position information is acquired in the vehicle-mounted terminal, it is not necessary to acquire the position information in the portable terminal.

Besides the above information, the safety information in the first aspect of the present invention preferably includes a message inputted by a user. The message is not limited, and a message that does not specify an address or a message that specifies one or a plurality of addresses are adoptable. Further, necessary information is preferably pre-stored in portable terminal as registration information, and the safety information preferably includes the registration information. The registration information is not limited, and examples thereof include personal information such as a name and an age.

In the first aspect of the present invention, in a case where the vehicle-mounted terminal has received the safety information from the other vehicle-mounted terminal, when the vehicle-mounted terminal already stores the safety information of the same portable terminal, the vehicle-mounted terminal preferably updates the stored safety information with the received safety information when the time information of the received safety information is newer than the time information of the stored safety information.

In the case where a plurality of the safety information items are transmitted from the portable terminal at different times, a plurality of the safety information items exist for the same portable terminal. As described above, in the case where the new safety information item has been received, by deleting the old safety information item, it is possible to save a storage capacity.

In addition, the first aspect of the present invention preferably further includes a step in which the second portable terminal transmits a request for the safety information related to a predetermined portable terminal to the vehicle-mounted terminal, and the safety information meeting the request is preferably transmitted to the second portable terminal in the step in which the safety information is transmitted from the vehicle-mounted terminal to the second portable terminal.

With this, it becomes possible for the user of the second portable terminal to acquire the safety information on a person that the user wants to know.

A safety information transmission method according to a second aspect of the present invention is a safety information transmission method in a safety information transmission system constituted by a portable terminal and a plurality of vehicle-mounted terminals, and includes a step in which a first portable terminal transmits data including a terminal ID, a step in which the vehicle-mounted terminal stores as safety information the terminal ID received from the first portable terminal in association with position information and time information acquired by the vehicle-mounted terminal, a step in which the vehicle-mounted terminal transmits the safety information to another vehicle-mounted terminal by a vehicle-to-vehicle communication, a step in which the vehicle-mounted terminal stores the safety information received from the other vehicle-mounted terminal by the vehicle-to-vehicle communication, and a step in which, in a case where any of the plurality of the vehicle-mounted terminals has reached a communication possible area of an access point, the vehicle-mounted terminal transmits the safety information stored in the vehicle-mounted terminal to an information server via the access point or transmits, in a case where the vehicle-mounted terminal has become capable of communicating with a second portable terminal different from the vehicle-mounted terminal, the safety information stored in the vehicle-mounted terminal to the second portable terminal.

In the second aspect of the present invention, the vehicle-mounted terminal receives the data including the terminal ID from the portable terminal. Herein, the terminal ID is, e.g., the MAC ID or the production number (serial number). It is possible to acquire the MAC ID by intercepting a packet used in a wireless communication by the portable terminal, and hence, in the present aspect, the vehicle-mounted terminal can detect the presence of the portable terminal without installing a special program in the portable terminal. In addition, by combining the position information and the time information acquired in the vehicle-mounted terminal with the MAC ID, it is possible to grasp when and where the portable terminal has existed. Consequently, this information can be used as the safety information. Thus, the second aspect of the present invention has an advantage that it is possible to acquire and spread the safety information without installing the special program in the portable terminal.

The present invention can be viewed as the safety information transmission method that executes at least part of the above processes. The present invention can be viewed as the safety information transmission system that includes means for executing at least part of the above processes, or can be viewed as the portable terminal or the vehicle-mounted terminal constituting the system. In addition, the present invention can also be viewed as a computer program for causing a computer to execute the method. The present invention can be configured by combining the means and processes described above in various possible ways.

Advantageous Effects of Invention

According to the present invention, it is possible to share the safety information widely and speedily even in the case where the operation of the wide area network is halted during disaster or the like.

BRIEF DESCRIPTION OF DRAWINGS

FIG. 1 is a view showing a schematic configuration of a safety information transmission system according to each of first and second embodiments.

FIG. 2 is a block diagram showing a configuration of a vehicle-mounted terminal according to the first embodiment.

FIG. 3 is a view for explaining a format of safety information.

FIG. 4 is a block diagram showing a configuration of a portable terminal according to the first embodiment.

FIG. 5 is a flowchart showing entire processes of a safety information transmission system in the event of a disaster in the first embodiment.

FIG. 6 is a flowchart showing a safety information transmission process of the portable terminal in the first embodiment.

FIG. 7 is a flowchart showing operations when the vehicle-mounted terminal receives the safety information from the portable terminal in the first embodiment.

FIG. 8 is a flowchart showing operations when the vehicle-mounted terminal receives the safety information from another vehicle-mounted terminal in the first embodiment.

FIG. 9 is a block diagram showing a configuration of a vehicle-mounted terminal according to the second embodiment.

FIG. 10 is a flowchart showing processes of the vehicle-mounted terminal in the event of a disaster in the second embodiment.

DESCRIPTION OF EMBODIMENTS

First Embodiment

<System Overview>

FIG. 1 is a view showing a schematic configuration of a safety information transmission system according to a first embodiment of the present invention. Broadly speaking, the present safety information transmission system is constituted by a plurality of vehicle-mounted terminals 101a to 101d (also referred to as a vehicle-mounted terminal 101 collectively), and a plurality of portable terminals 103a to 103d (also referred to as a portable terminal 103 collectively).

The vehicle-mounted terminal 101 is a computer device which moves together with a vehicle, and is capable of transmission and reception of a wireless LAN (IEEE 802.11 standard), and reception of AM/FM radio waves. The wireless LAN is used for communication between the vehicle-mounted terminals (vehicle-to-vehicle communication) and communication with the portable terminal 103. Besides the wireless LAN, any communication method such as a millimeter wave communication or DSRC (dedicated short range communication) can be adopted, and a plurality of methods may be combined or the vehicle-to-vehicle communication and the communication with the portable terminals may adopt different methods. Further, it is also preferable to adopt a cognitive communication in which communication is performed by using an available frequency band such as a white space communication.

The portable terminal 103 is a portable computer device such as a cellular phone, a smartphone, a notebook computer, or a tablet computer, and is capable of a wireless communication that uses a cellular network (3G network or the like) via a cellular base station 109, and a wireless communication by the wireless LAN. In addition, the portable terminal 103 preferably adopts the cognitive communication such as the white space communication. The portable terminal 103 is connectable to the wide area network such as the Internet via the cellular network or the wireless LAN during its normal operation, and is capable of transmission and reception of information over a wide area.

The cellular base stations 109 and 111 perform the wireless communication with the portable terminal 103, and relay conversations and communications between the portable terminal and the cellular network functioning as the terminal of the cellular network. The cellular network is also connected to the Internet, and the portable terminal 103 is capable of a wide area communication via the cellular base stations 109 and 111.

An AM/FM radio station 107 is a transmission facility that transmits AM or FM radio broadcasting. Besides usual radio broadcasting, the radio station 107 also performs emergency warning broadcasting, for example, in the case where a large-scale disaster such as an earthquake occurs. The emergency warning broadcasting notifies the occurrence of the large-scale disaster, and automatically turns on a switch of a receiver in a stand-by state.

The present embodiment assumes a situation in which a communication infrastructure such as the cellular base station 109 breaks down or the communication is limited due to the disaster such as a large earthquake. The portable terminal 103 becomes incapable of the transmission and reception of the information via the cellular base station 109. FIG. 1 shows only the cellular base station, but the present embodiment assumes a situation in which an Internet access via a wireless LAN access point is also unavailable.

When the above disaster occurs, an emergency disaster warning is transmitted from the radio station 107 using radio waves. When the vehicle-mounted terminal 101 receives the emergency disaster warning, the vehicle-mounted terminal 101 is switched to a disaster mode. When the vehicle-mounted terminal 101 is switched to the disaster mode, the vehicle-mounted terminal 101 executes processes such as distribution of a disaster application to the portable terminal, acquisition of safety information from the portable terminal, exchange/provision of the safety information with another vehicle-mounted terminal or the portable terminal, and uploading of the safety information to an information server (cloud) in the case where the Internet access is obtained.

The processes performed in the present system will be described briefly. The vehicle-mounted terminal 101a having received the emergency disaster warning from the radio station 107 is switched to the disaster mode, and distributes a disaster application program to the portable terminal 103 such as the portable terminal 103a with which the vehicle-mounted terminal 101a can directly communicate. The portable terminal 103a installs and starts the received disaster application program. In addition, the portable device 103a distributes the disaster application program to the surrounding portable terminals 103b and 103c, and thereby the disaster application program is installed in each of the surrounding portable terminals 103b and 103c which are connected to the portable terminal 103a by the direct communication.

From the portable terminal 103, the safety information is transmitted via the disaster application program (hereinafter referred to as "a disaster application"), and is received by the surrounding portable terminal 103 and the surrounding vehicle-mounted terminal 101. The vehicle-mounted terminal 101 spreads the received safety information to a surrounding area by exchanging the received safety information between the vehicle-mounted terminals. The vehicle-mounted terminal 101 carries the safety information also by movement of its vehicle itself. In the case where the vehicle-mounted terminal 101 has reached a communication available range of the cellular base station 111 or the wireless LAN access point (not shown) with which the vehicle-mounted terminal 101 can communicate, the vehicle-mounted terminal 101 uploads accumulated safety information to an information server 113. A user having access to the Internet can access the safety information uploaded to the information server 113 via a computer 115. In addition, the vehicle-mounted terminal 101 also transmits information received from the portable terminals 103a to 103c to a portable terminal 105 positioned at a geographically distant location.

<Configuration>

Hereinbelow, a configuration of each device will be described in detail.

Vehicle-Mounted Terminal 101

First, a configuration of the vehicle-mounted terminal 101 will be described. The vehicle-mounted terminal 101 includes various wireless communication devices, a radio receiver, a GPS device (position information acquisition device), a processor such as a CPU or an FPGA, and a storage device such as a semiconductor memory. The processor executes a computer program (an OS or an application program) stored in the storage device, and the vehicle-mounted terminal 101 thereby implements functions shown in FIG. 2. FIG. 2 is a block diagram showing a functional configuration of the vehicle-mounted terminal 101. The vehicle-mounted terminal 101 has functional sections including an emergency disaster warning detection section 201, a disaster application distribution section 203, a safety information reception section 205, a safety information update section 207, a safety information transmission section 209, a wireless communication section 211, a position information acquisition section 213, and a storage section 215.

The emergency disaster warning detection section 201 is a functional section that receives the emergency disaster warning transmitted from the radio station 107 or the like. When the emergency disaster warning detection section 201 detects the emergency disaster warning, the emergency disaster warning detection section 201 switches an operation mode of the vehicle-mounted terminal 101 to the disaster mode. Processes performed in the vehicle-mounted terminal 101 in the disaster mode will be described later.

The disaster application distribution section 203 is a functional section that distributes a disaster application 217 stored in the storage section 215 to the portable terminal 103 by the wireless communication (for example, the wireless LAN or Bluetooth (registered trademark)) via the wireless communication section 211. The disaster application is preferably automatically (without an operation by a user) distributed to the portable terminal 103 from the disaster application distribution section 203, and is preferably installed and executed. However, the portable terminal 103 may be notified that the disaster application is usable, and the disaster application may be downloaded and executed in response to the operation by the user of the portable terminal 103.

The safety information reception section 205 is a functional section that receives the safety information from the portable terminal 103 by the wireless communication. In addition, the safety information reception section 205 receives the safety information transmitted from another vehicle-mounted terminal 101 by the vehicle-to-vehicle communication. The safety information principally includes information that can identify the portable terminal or its user such as a terminal ID of the portable terminal 103, a telephone number, and the name of the user, position information indicative of the position from which the safety information is sent, and time information indicative of a time at which the safety information is sent. Further, the safety information may include any other information such as a message inputted by the user. The position information and the time information of the safety information are preferably added by the portable terminal 103 when the portable terminal 103 generates the safety information, but the position information and the time information obtainable in the vehicle-mounted terminal 101 may be added to the safety information when the safety information reception section 205 of the vehicle-mounted terminal 101 receives the safety information from the portable terminal 103.

The safety information update section 207 is a functional section that updates a safety information database 219 in the storage section 215 by using the safety information received by the safety information reception section 205. There are cases where the safety information received by the safety information reception section 205 relates to the portable terminal that is already stored in the safety information database 219. In these cases, the safety information update section 207 compares the time information of the received safety information with the time information of the stored safety information, and updates the safety information database 219 when the received safety information is newer. Otherwise, the received safety information is abandoned. In the case where the received safety information relates to the portable terminal that is not stored in the safety information database 219, the safety information update section 207 stores the received safety information in the safety information database 219.

The safety information transmission section 209 is a functional section that transmits the safety information stored in the safety information database 219 via the wireless communication section 211. As its transmission destination, mainly three targets are conceivable.

The first transmission destination of the safety information is another vehicle-mounted terminal 101. The safety information transmission section 209 transmits the safety information stored in the safety information database 219 to another vehicle-mounted terminal 101 by the vehicle-to-vehicle communication. An object of this operation is to propagate the safety information stored in each device to the surrounding vehicle-mounted terminal by the vehicle-to-vehicle communication. Consequently, the safety information to be transmitted is preferably information that is not held by the vehicle-mounted terminal as the destination. In order to transmit the information that is not held by the communication partner, it is necessary to grasp which safety information the partner holds, which requires a comparatively high processing cost. Consequently, the safety information transmission section 209 may select and transmit the safety information based only on the information stored in the safety information database 219 of its vehicle-mounted terminal 101. For example, it is conceivable to preferentially transmit the information in the reverse chronological order of the time information, and preferentially transmit the information having the position information within a predetermined range from the current position. Besides these, the information may also be selected and transmitted at random. If a sufficient communication capacity and a sufficient communication available time are provided, the entire safety information stored in the safety information database 219 may be transmitted.

The second transmission destination of the safety information is the portable terminal 103. The safety information transmission section 209 selects the safety information stored in the safety information database 219, and transmits the selected safety information to the portable terminal 103. A selection criterion of the safety information to be transmitted may be any criterion similarly to the above case. In the case where the safety information includes information related to a location to which the information is to be transmitted (distribution destination), it is preferable to preferentially transmit the safety information having the distribution destination close to the current position. In addition, the vehicle-mounted terminal 101 may receive a request for acquisition of the safety information from the portable terminal 103, and the safety information transmission section 209 may transmit the safety information to the portable terminal 103 in response to the request. For example, in the case where the vehicle-mounted terminal 101 receives from the portable terminal 103 a request for acquisition of the safety information related to the specific terminal ID, telephone number, or the username, the safety information transmission section 209 selects the safety information that meets the specified criterion, and transmits the selected safety information. In addition, in the case where the vehicle-mounted terminal 101 receives the terminal ID of the terminal, the telephone number, or the user name from the portable terminal 103, the safety information transmission section 209 selects the safety information having the terminal ID or the like as the distribution destination, and transmits the selected safety information.

The third transmission destination of the safety information is the information server 113 on the Internet. In the case where the safety information transmission section 209 has reached the communication available range of an operating base station such as the cellular base station 111 and obtained access to the wide area network such as the Internet, the safety information transmission section 209 transmits the safety information stored in the safety information database 219 to the information server 113. The same applies to the case where the safety information transmission section 209 can be connected to the wide area network via the wireless LAN access point instead of the cellular base station. The safety information transmission section 209 may transmit the entire safety information stored in the safety information database 219, but it is not necessary to transmit the safety information having an upload flag. In the case where there are many safety information items without the upload flag, the safety information items may be preferentially transmitted in a proper order such as the reverse chronological order of the time information. At the same time as the safety information is transmitted to the information server 113 and, the safety information may be acquired from the information server 113.

The wireless communication section 211 is a functional section that performs the wireless communication by various wireless communication methods. As long as the vehicle-mounted terminal 101 has a function of being capable of communicating with the portable terminal 103, another vehicle-mounted terminal 101, and the information server 113 via the access point, the type of the wireless communication method to be adopted and the number thereof are not particularly limited. In the present embodiment, the communication with these devices is performed by using an available frequency band (white space) mainly by the wireless LAN (IEEE 802.11).

The position information acquisition section 213 acquires information (e.g., latitude, longitude, and altitude) indicative of the current position from the GPS device (not shown). Herein, the position information is acquired via the GPS device, but other satellite positioning systems may be used, and the position information may be acquired by a method such as a base station positioning. In addition, the information indicative of the position may be information having any form such as an area ID like a map code (registered trademark) besides the information indicative of the latitude, longitude, and altitude.

The storage section 215 is a storage device such as a semiconductor memory or a hard disk device. In the storage section 215, a computer program executed by the processor of the vehicle-mounted terminal 101 is stored. In the storage section 215, the disaster application program 217 and the safety information database 219 are further stored. The disaster application program 217 is distributed to the portable terminal 103, and is installed and executed. The safety information database 219 stores the safety information received from the portable terminal 103 and another vehicle-mounted terminal 101.

Herein, a format of the safety information will be described with reference to FIG. 3. The safety information includes a terminal ID 301 (a MAC address or a serial number) of the portable terminal 103, a telephone number 302, and a user ID 303 (or the name). These information items are information items for identifying the portable terminal 103 or its user, and the safety information preferably includes at least one of the above information items. The safety information includes position information 304, time information 305, and an free message 306. The position information 304 indicates the position of the portable terminal 103 when the safety information is generated. The time information 305 indicates a time when the safety information is generated. The free message 306 is any text message inputted by the user of the portable terminal 103. Note that the position information 304 and the time information 305 may be added by the vehicle-mounted terminal 101 instead of being generated by the portable terminal 103. The free message 306 can be omitted, and other information items may be added to the safety information.

Portable Terminal 103

Next, a configuration of the portable terminal 103 will be described. The portable terminal 103 includes various wireless communication devices, the GPS device (position information acquisition device), the processor such as the CPU or the FPGA, and the storage device such as the semiconductor memory. The processor executes a computer program (the OS or the application program) stored in the storage device, and the portable terminal 103 thereby implements functions shown in FIG. 4. FIG. 4 is a block diagram showing a functional configuration of the portable terminal 103. The portable terminal 103 has functional sections including a safety information generation section 401, a safety information transmission section 403, a safety information reception section 404, a safety information retrieval section 405, an input section 407, an output section 409, a wireless communication section 411, a position information acquisition section 413, and a storage section 415. The CPU or the like executes the disaster application distributed from the vehicle-mounted terminal 101 and installed in the vehicle-mounted terminal 103, and these functional sections are thereby implemented.

The safety information generation section 401 is a functional section that generates the safety information periodically or at a timing when an explicit instruction is issued by the user. The terminal ID, the telephone number, and the user ID in the safety information may be acquired by using registration information 417 stored in the storage section 415. In addition, the position information may be acquired via the position information acquisition section 413, and the time information may be acquired from a system clock (not shown). In the case where the text message is included in the safety information, the message stored in the storage section 415 as the registration information 417 may be used, or the message inputted by the user via the input section 407 may be used. The safety information generated by the safety information generation section 401 is temporarily stored in the storage section 415.

The safety information transmission section 403 is a functional section that transmits the safety information stored in the storage section 415 via the wireless communication section 411. As its transmission destination, mainly two targets are conceivable.

The first transmission destination of the safety information is the vehicle-mounted terminal 101. The safety information transmission section 403 transmits the safety information stored in the storage section 415 to the vehicle-mounted terminal 101. The safety information to be transmitted is preferably the safety information generated recently by the safety information generation section 401, and it is also preferable to transmit any safety information stored by the portable terminal 103 besides the safety information recently generated by the safety information generation section 401. With the transmission of the safety information to the vehicle-mounted terminal 101, it is possible to propagate the safety information to a surrounding area by the vehicle-to-vehicle communication of the vehicle-mounted terminals 101 and the movement of the vehicle-mounted terminal 101 itself.

The second transmission destination of the safety information is another portable terminal 103. The safety information transmission section 403 transmits the safety information stored in the storage section 415 to another vehicle-mounted terminal 103. An object of this operation is to propagate the safety information to the surrounding portable terminal via the communication between the portable terminals. With this, it is possible to transmit the safety information to the portable terminal 103 connected directly or indirectly by the communication. Further, this increases opportunity that either of the portable terminals 103 can transmit the safety information to the vehicle-mounted terminal 101.

The safety information reception section 404 is a functional section that receives the safety information from the vehicle-mounted terminal 101 and another portable terminal 103 by the wireless communication. The safety information received by the safety information reception section 404 is stored in the storage section 415. Although not shown in FIG. 4, similarly to the safety information update section 207 in the vehicle-mounted terminal 101, it is preferable to adopt a configuration in which the time information of the received safety information is compared with the time information of the safety information stored in the storage section 415 and, when the received safety information is newer, the storage section 415 is updated.

The safety information retrieval section 405 is a functional section that acquires the safety information that satisfies a predetermined retrieval criterion from the vehicle-mounted terminal 101 or another portable terminal 103. An example of the retrieval criterion is a criterion that can identify the portable terminal 103 or the user such as the terminal ID, the telephone number, or the user ID. As other examples thereof, it is possible to adopt, for example, the position information (the safety information generated within a specific range) and the time information (the safety information generated at a specific time). Besides the above examples, it is possible to adopt any criteria as the retrieval criterion, and the criteria may be combined. The safety information retrieval section 405 may receive the input of the retrieval criterion from the user via the input section 407, or the retrieval criterion inputted by the user may be stored in the storage section 415, and the safety information retrieval section 405 may acquire the retrieval criterion from the storage section 415. The safety information retrieval section 405 transmits a safety information acquisition request including the retrieval criterion to the vehicle-mounted terminal 101 or another portable terminal 103, and obtains a response. The safety information obtained as the result is stored in the storage section 415, or is presented to the user by the output section 409.

The input section 407 is a functional section that accepts the input from the user. The input section 407 accepts the input from the user via input devices such as, e.g., a touch panel, a keyboard, a button, and a mouse.

The output section 409 is a functional section that provides outputs such as an image and a sound to the user. The output section 409 provides information to the user via output devices such as an image display device and a sound output device.

The wireless communication section 411 is a functional section that performs the wireless communication with another portable terminal 103 and the vehicle-mounted terminal 101. As long as the wireless communication section

411 has a function of being capable of communicating with another portable terminal 103, the vehicle-mounted terminal 101, and the information server 113 via the access point, the type of the corresponding wireless communication method and the number thereof are not particularly limited. In the present embodiment, the communication with these devices is performed mainly by the wireless LAN (IEEE 802.11). The vehicle-to-vehicle communication is preferably capable of information transmission even in a situation in which continuous connection is not possible by adopting a method corresponding to a delay tolerant network (DTN).

The position information acquisition section 413 acquires information (e.g., latitude, longitude, and altitude) indicative of the current position from the GPS device (not shown). Herein, the position information is acquired via the GPS device, but other satellite positioning systems may be used, and the position information may be acquired by a method such as the base station positioning. In addition, the information indicative of the position may be information having any form such as the area ID like the map code (registered trademark) besides the information indicative of the latitude, longitude, and altitude.

The storage section 415 is a storage device such as the semiconductor memory or the hard disk device. In the storage section 415, a computer program (including the disaster application distributed from the vehicle-mounted terminal 101 or the like) executed by the processor of the portable terminal 103 is stored. Further, in the storage section 415, the registration information 417 used for the generation of the safety information is stored. The registration information 417 is information related to, e.g., the terminal ID (the MAC ID and the production number), the name, the telephone number, and the contact address. Besides the above information, the registration information 417 may also include any information that the user desires to transmit. In the storage section 415, safety information 419 is also stored. The stored safety information corresponds to the safety information generated by the safety information generation section 401 and the safety information received by the safety information reception section 404 from the vehicle-mounted terminal 101 or another portable terminal 103.

Information Server 113

The information server 113 is constituted by one or a plurality of server devices connected to each other on the Internet. The information server 113 accumulates the safety information transmitted from the vehicle-mounted terminal 101, and provides the safety information to the computer 115 that accesses the information server 113 via the Internet. When the safety information is provided, the information that is narrowed down using any criterion may be provided to the computer 115 from the information server 113. When the access to the information server 113 from the computer 115 is performed with a web browser by using, e.g., HTTP, it is not necessary to install a special program in the computer 115.

<Method>

Next, operations of the safety information transmission system according to the present embodiment will be described with reference to the drawings. FIG. 5 is a flowchart showing entire processes of the safety information transmission system in the event of a disaster. FIG. 6 is a flowchart showing a safety information transmission process in the portable terminal 103. FIG. 7 is a flowchart showing a process when the vehicle-mounted terminal 101 receives the safety information from the portable terminal 103. FIG. 8 is a flowchart showing a process when the vehicle-mounted terminal 101 receives the safety information from another vehicle-mounted terminal 101.

First, with reference to FIG. 5, the entire processes of the safety information transmission system will be described. In the case where a large-scale disaster such as an earthquake occurs, the emergency disaster warning is transmitted from the radio station 107. When the vehicle-mounted terminal 101 detects the emergency disaster warning via the emergency disaster warning detection section 201 (S501), the vehicle-mounted terminal 101 is switched to the disaster mode (S503). Here, assumed is a situation in which the function of the cellular base station 109 is halted due to the large-scale disaster. Consequently, the portable terminals 103a to 103c become incapable of the transmission and reception of the information via the cellular base station 109 (cellular network).

When the vehicle-mounted terminal 101 is switched to the disaster mode, the vehicle-mounted terminal 101 starts the distribution of the disaster application 217 stored in the storage section 215 to the surrounding portable terminal 103 (S505). Note that it is preferable to execute the distribution of the disaster application not only immediately after the vehicle-mounted terminal 101 is switched to the disaster mode but also continuously thereafter. When the portable terminal 103 receives the disaster application from the vehicle-mounted terminal 101 via the wireless communication section 411, the portable terminal 103 installs and executes the disaster application (S507). Further, the portable terminal 103 propagates the disaster application to the surrounding portable terminal by the communication between the portable terminals.

When the portable terminal 103 starts the disaster application, the portable terminal 103 generates the safety information periodically or at the timing when the instruction is issued by the user (S509). The safety information includes the terminal ID and the position information. The generation of the safety information in Step S509 will be described with reference to FIG. 6. When generating the safety information, the safety information generation section 401 acquires the registration information 417 such as the terminal ID, the telephone number, and the name from the storage section 415 (S601). In addition, the safety information generation section 401 acquires the position information via the position information acquisition section 413 (S603), and acquires the time information from the system clock (S605). The processes in Steps S603 and S605 can be omitted. In the case where the message input by the user is present (S607—YES), the safety information generation section 401 acquires the message input from the user via the input section 407 (S609). The safety information generation section 401 generates the safety information that includes the terminal ID, the telephone number, the name, the position information, the time information, and the message thus acquired (S611).

The generated safety information is transmitted to the surrounding vehicle-mounted terminal 101 and another portable terminal 103 via the safety information transmission section 403 (S511). The generated safety information may be stored in the storage section 415, and the same information may be transmitted later. Although the newest safety information may be constantly generated and transmitted, the safety information may not be newly generated for a specific time period, and the same safety information may be transmitted to the surrounding area. It is preferable to continuously perform the generation and transmission of the safety information during the execution of the disaster application. In addition, in the transmission process of the safety information, besides the safety information generated by the portable terminal 103, the safety information received from the vehicle-mounted terminal 101 or another portable terminal 103 may also be transmitted.

When the vehicle-mounted terminal 101 receives the safety information from the portable terminal 103 (S513), the vehicle-mounted terminal 101 performs an update process of the safety information database 219. The update process in Step S513 will be described with reference to FIG. 7. When the safety information reception section 205 of the vehicle-mounted terminal 101 receives the safety information by the direct communication with the portable terminal 103 (S701), in the case where the safety information does not include the position information and the time information, the position information is acquired from the position information acquisition section 213 (S703), the position information is acquired from the system clock of the vehicle-mounted terminal 101 (S705), and these information items are included in the safety information. In the case where the safety information generated by the portable terminal 103 is directly received, the safety information update section 207 may overwrite and update the safety information database 219 by using the safety information. In the case where the safety information generated by the portable terminal 103 is directly received, it is guaranteed that the safety information is the newest information, and hence it is possible to omit checking of the time information. In the case where the safety information relayed by a plurality of the portable terminals 103 is received, it is necessary to perform an update process (FIG. 8) described later.

The vehicle-mounted terminal 101 shares the safety information among the vehicle-mounted terminals by using the vehicle-to-vehicle communication (S515). All of the safety information items are preferably shared by all of the vehicle-mounted terminals. However, in the case where the transmittable data amount is limited, proper priorities may be assigned and only a part of the safety information may be shared. Processes when the vehicle-mounted terminal 101 acquires the safety information from another vehicle-mounted terminal will be described with reference to FIG. 8. When the safety information reception section 205 of the vehicle-mounted terminal 101 receives the safety information from the portable terminal 103 or another vehicle-mounted terminal 101 by the relay (S801), the safety information update section 207 determines whether or not the safety information of the same user (the same terminal) is retained in the safety information database 219 based on the terminal ID or the like of the safety information (S803). When the safety information of the same user (the same terminal) is not retained in the safety information database 219 (S803—NO), the received safety information is stored in the safety information database 219 (S807). In the case where the safety information of the same user (the same terminal) is retained (S803—YES), the time information of the received safety information is compared with the time information of the safety information stored in the safety information database 219 and, when the received safety information is newer (S805—YES), the safety information in the database is overwritten with the received safety information (S807). Conversely, when the received safety information is older (S805—NO), the received safety information packet is abandoned (S809).

Thus, the safety information is exchanged between the vehicle-mounted terminals 101, and the safety information is thereby spread over a geographically wide area. In addition, the vehicle-mounted terminal 101 itself moves while retaining the safety information, and the safety information is also thereby spread geographically.

Returning to the description of FIG. 5, the vehicle-mounted terminal 101 moves while searching for the access to the wide area network. In the case where the access to the wide area network is detected such as the case where the vehicle-mounted terminal 101 has reached, e.g., the communication area of the operating cellular base station 111 during the movement (S507—YES), the safety information stored in the safety information database 219 is transmitted to the information server 113 (S519). The safety information transmission section 209 may appropriately transmit information in the safety information stored in the safety information database 219 that is not uploaded to the information server 113.

When the disaster has ended (S521—YES), the vehicle-mounted terminal 101 is switched back to the normal mode and ends the above processes, but the vehicle-mounted terminal 101 repeatedly executes the above processes during continuation of the disaster (S521—NO).

<Effects of Present Embodiment>

According to the safety information transmission system according to the present embodiment, the vehicle (the vehicle-mounted terminal) can collect the safety information of an area in which the communication is cut off due to the disaster or the like, and transmit the collected safety information to the communication possible area by its travelling or performing the vehicle-to-vehicle communication. Alternatively, the vehicle-mounted terminal can also transmit the safety information between isolated communication areas.

In addition, since the safety information carried to the communication possible area is integrated in the information server, any user can access the safety information. Consequently, it is possible to share the information of a disaster area relatively speedily.

Further, when the vehicle-mounted terminal is notified of the emergency disaster warning, the disaster application is distributed to the portable terminal from the vehicle-mounted terminal, and the disaster application is automatically executed in the portable terminal, and hence it becomes possible to perform the transmission of the information even in the case where the disaster application is not pre-installed in the portable terminal.

<Modification of First Embodiment>

In the above description, the description has been made on the assumption that the disaster application is automatically distributed to the portable terminal from the vehicle-mounted terminal in the event of a disaster, and is installed and executed. However, as long as the disaster application is installed in the portable terminal and is executed in the end, its method is not particularly limited. For example, a notification that the disaster application is available and an inquiry of whether or not download and installation are performed may be transmitted to the portable terminal from the vehicle-mounted terminal and, in the case where the portable terminal selects the download, the disaster application may be distributed to the portable terminal from the vehicle-mounted terminal. Alternatively, the disaster application may be pre-installed in the portable terminal before the disaster occurs. In this case, it is preferable to execute the disaster application in the case where the portable terminal receives the emergency disaster warning.

Second Embodiment

In the first embodiment, the disaster application is installed in the portable terminal, and the collection and transmission of the safety information are performed. In the present embodiment, the collection and transmission of the safety information are performed without installing the disaster application in the portable terminal. The vehicle-mounted terminal serves as the access point of the wireless LAN and acquires the terminal ID (the MAC ID or the like) of the portable terminal that accesses the vehicle-mounted terminal, whereby the vehicle-mounted terminal can grasp when and where the portable terminal is present. In the present embodiment, this information is used as the safety information. It is possible to acquire the terminal ID only by examining the packet in the communication using the wireless LAN, and hence it is not necessary to install the disaster application in the portable terminal in the present embodiment.

A configuration of the entire system in the present embodiment is the same as that in the case of the first embodiment (FIG. 1), and hence the description thereof will be omitted. A configuration of the vehicle-mounted terminal 101 in the present embodiment will be described with reference to FIG. 9. In the present embodiment, the disaster application distribution section 203 is omitted in the vehicle-mounted terminal 101, and the disaster application 217 is not stored in the storage section 215. Instead, although not essential, a table 221 in which a correspondence between the terminal ID and the user ID is stored is stored in the storage section 215. In the table 221, the correspondence between the MAC ID of the terminal and the user ID or the name or the telephone number is stored. The configuration of the vehicle-mounted terminal 101 is otherwise the same as that in the first embodiment, and hence the description thereof will be omitted.

The portable terminal 103 in the present embodiment is the same as a normal portable terminal, and hence the detailed description thereof will be omitted. The portable terminal 103 is capable of the communication via the cellular network and the communication via the wireless LAN.

Operations in the present embodiment will be described by focusing mainly on operations of the vehicle-mounted terminal 101. FIG. 10 is a flowchart showing processes of the vehicle-mounted terminal 101 in the present embodiment.

When the vehicle-mounted terminal 101 detects the emergency disaster warning (S1001), the vehicle-mounted terminal 101 is switched to the disaster mode (S1003). This operation is the same as that in the first embodiment. When the vehicle-mounted terminal 101 is switched to the disaster mode, the vehicle-mounted terminal 101 functions as the access point of the wireless LAN, and provides information to the portable terminal 103 (S1004). For example, information that is effective at the time of disaster (effective information such as map information or an evacuation route) may be provided to the portable terminal 103. At this point, the vehicle-mounted terminal 101 acquires the terminal ID included in the packet of the wireless LAN communication (S1005). As the terminal ID, it is possible to adopt, e.g., the MAC ID.

When the vehicle-mounted terminal 101 acquires the terminal ID from the portable terminal 103, the vehicle-mounted terminal 101 acquires the position information and the time information at the time of the reception from the position information acquisition section 213 and the system clock (not shown) (S1007). Subsequently, the vehicle-mounted terminal 101 generates information including the terminal ID, the position information, and the time information as the safety information, and stores the generated safety information in the safety information database 219 (S1009). At this point, when the terminal ID/user ID correspondence table 221 is available, the user ID or the telephone number corresponding to the received terminal ID is preferably included in the safety information.

Note that data that encourages the input of, for example, the name, the telephone number, the current state, and a free message may be transmitted to the portable terminal 103 from the vehicle-mounted terminal 101, and the above information may be acquired from the user of the portable terminal 103. With this, it is possible to collect the safety information having a more information amount.

Operations after the safety information is stored in the safety information database 219 (S1011 to S1017) are the same as those in the first embodiment (S515 to S521), and hence the description thereof will be omitted.

Note that, in the case where the user ID or the like is not included in the safety information in the present embodiment, it is preferable for the information server 113 to add the user ID or the telephone number corresponding to the terminal ID to the safety information. By including the user ID or the telephone number in the safety information, other users can perform retrieval by using the user ID or the telephone number as a key.

According to the present embodiment, it becomes possible to collect and transmit the safety information without distributing the disaster application to the portable terminal. In the present embodiment, the safety information is collected in the case where the communication by the wireless LAN is performed between the portable terminal and the vehicle-mounted terminal. Considering the fact that the portable terminal is operated only by its owner in general, it is possible to acquire the position of presence of the owner of the portable terminal. Even in the case where detailed data cannot be received from the user of the portable terminal, it is possible to collect and transmit at least the position where and the time when the communication is performed by using the portable terminal (i.e., the portable terminal is in action).

REFERENCE SIGNS LIST

101*a*, 101*b*, 101*c*, 101*d* Vehicle-mounted terminal
103*a*, 103*b*, 103*c*, 105 Portable terminal
107 Radio station
109, 111 Mobile phone base station
113 Information server

The invention claimed is:

1. A safety information transmission method in a safety information transmission system constituted by a portable terminal and a plurality of vehicle-mounted terminals, comprising:
receiving a disaster occurrence notification at a first vehicle-mounted terminal;
distributing a disaster application program from the first vehicle-mounted terminal to a first portable terminal in response to reception of the disaster occurrence notification;
installing the disaster application program in the first portable terminal;
transmitting safety information from the first portable terminal to the first vehicle-mounted terminal using the disaster application program;
storing the safety information in the first vehicle-mounted terminal;
transmitting the safety information from the first vehicle-mounted terminal to a second vehicle-mounted terminal by a vehicle-to-vehicle communication;

storing, in the first vehicle-mounted terminal, safety information received from the second vehicle-mounted terminal by the vehicle-to-vehicle communication;

transmitting, from the first or second vehicle-mounted terminal, safety information stored therein to an information server via an access point in a case where the first or second vehicle-mounted terminal has reached a communication possible area of the access point, or transmitting the safety information stored therein to a second portable terminal in a case where the first or second vehicle-mounted terminal has become capable of communicating with the second portable terminal.

2. The safety information transmission method according to claim 1, further comprising:
distributing the disaster application program from the first portable terminal to a third portable terminal.

3. The safety information transmission method according to claim 1, wherein the safety information transmitted from the first portable terminal includes a terminal ID, position information, and time information.

4. The safety information transmission method according to claim 3, wherein
in a case where the first vehicle-mounted terminal has received the safety information from the second vehicle-mounted terminal, if the first vehicle-mounted terminal already stores the safety information of a same portable terminal, the first vehicle-mounted terminal updates the stored safety information with the received safety information if the time information of the received safety information is newer than the time information of the stored safety information.

5. The safety information transmission method according to claim 1, wherein
the safety information transmitted from the first portable terminal includes a terminal ID, and
the first vehicle-mounted terminal acquires position information and time information and stores the position information and the time information such that the safety information includes the position information and the time information.

6. The safety information transmission method according to claim 1, wherein
the safety information transmitted from the first portable terminal includes a message inputted by a user of the first portable terminal.

7. The safety information transmission method according to claim 1, wherein
registration information is pre-stored in the first portable terminal, and
the safety information includes the registration information.

8. The safety information transmission method according to claim 1, further comprising:
transmitting a request for safety information related to a predetermined portable terminal from the second portable terminal to the first or second vehicle-mounted terminal; and
transmitting safety information meeting the request from the first or second vehicle-mounted terminal to the second portable terminal.

9. A safety information transmission method in a safety information transmission system constituted by a portable terminal and a plurality of vehicle-mounted terminals, comprising:
receiving a disaster occurrence notification at a first vehicle-mounted terminal;

distributing a disaster application program from the first vehicle-mounted terminal to a first portable terminal in response to reception of the disaster occurrence notification;

installing the disaster application program in the first portable terminal;

transmitting a terminal ID from the first portable terminal to the first vehicle-mounted terminal using the disaster application program;

storing as safety information in the first vehicle-mounted terminal, the terminal ID received from the first portable terminal in association with position information and time information acquired by the first vehicle-mounted terminal;

transmitting the safety information from the first vehicle-mounted terminal to a second vehicle-mounted terminal by a vehicle-to-vehicle communication;

storing, in the first vehicle-mounted terminal, safety information received from the second vehicle-mounted terminal by the vehicle-to-vehicle communication; and transmitting, from the first or second vehicle-mounted terminal, safety information stored therein to an information server via an access point in a case where the first or second vehicle-mounted terminal has reached a communication possible area of the access point, or transmitting the safety information stored therein to a second portable terminal in a case where the first or second vehicle-mounted terminal has become capable of communicating with the second portable terminal.

10. A safety information transmission system, comprising:
a first portable terminal having:
a portable storage that stores safety information;
a portable communicator; and
a portable processor configured to:
receive a disaster application program via the portable communicator;
install the disaster application program in the portable storage; and
transmit the safety information via the portable communicator using the disaster application program; and
a first vehicle-mounted terminal having:
a vehicle-mounted communicator;
a vehicle-mounted storage; and
a vehicle-mounted processor configured to:
receive a disaster occurrence notification;
distribute the disaster application program to the first portable terminal via the vehicle-mounted communicator in response to reception of the disaster occurrence notification;
receive the safety information from the first portable terminal via the vehicle-mounted communicator;
store the received safety information in the vehicle-mounted storage;
transmit the stored safety information to a second vehicle-mounted terminal via the vehicle-mounted communicator by a vehicle-to-vehicle transmission; and
transmit the stored safety information to an information server via the vehicle-mounted communicator and an access point in a case where the first vehicle-mounted terminal has reached a communication possible area of the access point, or transmit the stored safety information to a second portable terminal via the vehicle-mounted communicator in a case where the first vehicle-mounted terminal has become capable of communicating with the second portable terminal.

11. A safety information transmission system, comprising:
a first portable terminal having:
    a portable storage that stores a terminal ID;
    a portable communicator; and
    a portable processor configured to:
        receive a disaster application program via the portable communicator;
        install the disaster application program in the portable storage; and
        transmit the terminal ID via the portable communicator using the disaster application program; and
a first vehicle-mounted terminal having:
    a vehicle-mounted communicator;
    a vehicle-mounted storage; and
    a vehicle-mounted processor configured to:
        receive a disaster occurrence notification;
        distribute the disaster application program to the first portable terminal via the vehicle-mounted communicator in response to reception of the disaster occurrence notification;
        receive the terminal ID transmitted by the first portable terminal via the vehicle-mounted communicator;
        acquire position information;
        acquire time information;
        store as safety information the received terminal ID in association with the acquired position information and the acquired time information;
        transmit the stored safety information to a second vehicle-mounted terminal via the vehicle-mounted communicator by a vehicle-to-vehicle transmission; and
transmit the stored safety information to an information server via the vehicle-mounted communicator and an access point in a case where the first vehicle-mounted terminal has reached a communication possible area of the access point, or transmit the stored safety information to a second portable terminal via the vehicle-mounted communicator in a case where the first vehicle-mounted terminal has become capable of communicating with the second portable terminal.

* * * * *